(12) United States Patent
Zhou et al.

(10) Patent No.: US 11,245,465 B2
(45) Date of Patent: Feb. 8, 2022

(54) CONTROL CHANNEL FOR BEAM FAILURE RECOVERY PRIORITIZATION

(71) Applicant: QUALCOMM Incorporated, San Diego, CA (US)

(72) Inventors: Yan Zhou, San Diego, CA (US); Seyedkianoush Hosseini, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,593

(22) Filed: Feb. 27, 2020

(65) Prior Publication Data

US 2021/0135740 A1 May 6, 2021

Related U.S. Application Data

(60) Provisional application No. 62/928,314, filed on Oct. 30, 2019.

(51) Int. Cl.
*H04B 7/08* (2006.01)
*H04W 72/04* (2009.01)
*H04W 72/12* (2009.01)
*H04L 1/18* (2006.01)
*H04W 76/27* (2018.01)
*H04W 80/02* (2009.01)
*H04W 72/10* (2009.01)

(52) U.S. Cl.
CPC ........... *H04B 7/088* (2013.01); *H04L 1/1819* (2013.01); *H04W 72/042* (2013.01); *H04W 72/0413* (2013.01); *H04W 72/10* (2013.01); *H04W 72/1268* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2011/0237288 | A1* | 9/2011 | Ratasuk | H04W 52/32 455/522 |
| 2011/0310986 | A1* | 12/2011 | Heo | H04W 76/27 375/259 |
| 2013/0039231 | A1* | 2/2013 | Wang | H04L 5/001 370/280 |
| 2013/0242902 | A1* | 9/2013 | Liu | H04B 7/0619 370/329 |

(Continued)

OTHER PUBLICATIONS

International Search Report and Written Opinion—PCT/US2020/053588—ISA/EPO—dated Nov. 24, 2020.

(Continued)

*Primary Examiner* — Hassan A Phillips
*Assistant Examiner* — Gautam Sharma
(74) *Attorney, Agent, or Firm* — Patterson+ Sheridan, L.L.P.

(57) ABSTRACT

Certain aspects of the present disclosure provide techniques for managing beam failure recovery operations. A method that may be performed by a user equipment (UE) generally includes selecting a priority associated with an uplink (UL) control channel for indicating a beam failure recovery request (BFRQ), detecting that the UL control channel is scheduled for transmission using first resources at least partially overlapped with second resources scheduled for transmission of another UL signal, determining, in response to the detection, whether to transmit the UL control channel based on the priority associated with the UL control channel, and transmitting or dropping the UL control channel in accordance with the determination.

28 Claims, 5 Drawing Sheets

(56) References Cited

U.S. PATENT DOCUMENTS

| | | | | |
|---|---|---|---|---|
| 2013/0258874 | A1* | 10/2013 | Khoshnevis | H04L 1/0031 370/252 |
| 2015/0201429 | A1* | 7/2015 | Chen | H04W 72/1242 370/329 |
| 2016/0044655 | A1* | 2/2016 | Park | H04W 72/1284 370/329 |
| 2018/0323856 | A1* | 11/2018 | Xiong | H04B 7/088 |
| 2019/0052339 | A1* | 2/2019 | Zhou | H04W 52/346 |
| 2019/0053288 | A1* | 2/2019 | Zhou | H04B 7/0695 |
| 2019/0058519 | A1* | 2/2019 | Davydov | H04L 5/0053 |
| 2019/0068268 | A1* | 2/2019 | Zhang | H04B 7/0408 |
| 2019/0074882 | A1* | 3/2019 | Zhou | H04L 5/005 |
| 2019/0190582 | A1* | 6/2019 | Guo | H04L 5/0048 |
| 2020/0137695 | A1* | 4/2020 | Papasakellariou | H04W 72/1289 |
| 2020/0145280 | A1* | 5/2020 | Cirik | H04W 72/10 |
| 2020/0177263 | A1* | 6/2020 | Zhang | H04W 74/0833 |
| 2020/0204308 | A1* | 6/2020 | Chen | H04L 5/0007 |
| 2020/0228248 | A1* | 7/2020 | Islam | H04L 5/0055 |
| 2021/0036757 | A1* | 2/2021 | Yu | H04B 7/0626 |
| 2021/0037555 | A1* | 2/2021 | Papasakellariou | H04W 72/1289 |

OTHER PUBLICATIONS

OPPO: "Discussion on Multi-beam Operation Enhancements", 3GPP Draft, 3GPP TSG RAN WG1 #98bis, R1-1910117, 3rd Generation Partnership Project (3GPP), Mobile Competence Centre, 650, Route Des Lucioles, F-06921, Sophia-Antipolis Cedex, France, vol. RAN WG1, no. Chongqing, China; Oct. 14, 2019-Oct. 20, 2019, Oct. 4, 2019 (Oct. 4, 2019), XP051808071, 11 pages, Retrieved from the Internet URL: https://ftp.3gpp.org/tsg_ran/WG1_RL1/TSGR1_98b/Docs/R1-1910117.zip R1-1910117.docx [retrieved on Oct. 4, 2019] pp. 5-7, 2.2. SCell BFR.

FUJITSU: "Enhancements on Multi-beam Operation", 3GPP Draft, 3GPP TSG RAN WG1 #98bis, R1-1910191, Enhancements on Multi-beam Operation, 3rd Generation Partnership Project (3GPP), Mobile Competence Centre, 350, Route Des Lucioles, F-06921, Sophia-Antipolis Cedex, France, vol. RAN WG1, No. Chongqing, China, Oct. 14, 2019-Oct. 19, 2019 Oct. 3, 2019 (Oct. 3, 2019), XP051788998, 8 pages.

Lenovo, et al., "Discussion of Multi-beam Operation", 3GPP Draft, 3GPP TSG RAN WG1 Meeting #98bis, R1-1910143 Multi Beam, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 18, 2019, Oct. 4, 2019 (Oct. 4, 2019), XP051808084, 8 pp. 5-7, 2.4 SCell beam failure recovery.

LG Electronics: "Discussion on Multi-beam Based Operations and Enhancements," 3GPP Draft, 3GPP TSG RAN WG1 Meeting #98bis, R1-1910583 Multi-Beam Final, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 19, 2019, Oct. 5, 2019 (Oct. 5, 2019), XP051808600, 8 pages, the whole document.

3GPP: "RAN1 Chairman's Notes", 3GPP TSG RAN WG1 Meeting #98bis, Chongqing, China, Oct. 14-20, 2019, 117 Pages.

* cited by examiner

CONTROL CHANNEL FOR BEAM FAILURE RECOVERY PRIORITIZATION

CROSS-REFERENCE TO RELATED APPLICATIONS

This application claims benefit of U.S. Provisional Patent Application Ser. No. 62/928,314, filed Oct. 30, 2019, which is expressly incorporated herein by reference in its entirety.

INTRODUCTION

Aspects of the present disclosure relate to wireless communications, and more particularly, to techniques for managing beam failure recovery operations.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam failure detection.

Certain aspects provide a method for wireless communication by a user equipment (UE). The method generally includes selecting a priority associated with an uplink (UL) control channel for indicating a beam failure recovery request (BFRQ), detecting that the UL control channel is scheduled for transmission using first resources at least partially overlapped with second resources scheduled for transmission of another UL signal, determining, in response to the detection, whether to transmit the UL control channel based on the priority associated with the UL control channel, and transmitting or dropping the UL control channel in accordance with the determination.

Certain aspects provide an apparatus for wireless communication by a UE. The apparatus generally includes a memory and a processor coupled to the memory, the memory and the processor being configured to select a priority associated with an UL control channel for indicating a BFRQ, detect that the UL control channel is scheduled for transmission using first resources at least partially overlapped with second resources scheduled for transmission of another UL signal, determine, in response to the detection, whether to transmit the UL control channel based on the priority associated with the UL control channel, and transmit or drop the UL control channel in accordance with the determination.

Certain aspects provide an apparatus for wireless communication by a UE. The apparatus generally includes means for selecting a priority associated with an UL control channel for indicating a beam failure recovery request (BFRQ), means for detecting that the UL control channel is scheduled for transmission using first resources at least partially overlapped with second resources scheduled for transmission of another UL signal, means for determining, in response to the detection, whether to transmit the UL control channel based on the priority associated with the UL control channel, and means for transmitting or dropping the UL control channel in accordance with the determination.

Certain aspects provide a computer-readable medium having instructions stored thereon to cause a UE to select a priority associated with an UL control channel for indicating a BFRQ, detect that the UL control channel is scheduled for transmission using first resources at least partially overlapped with second resources scheduled for transmission of another UL signal, determine, in response to the detection, whether to transmit the UL control channel based on the priority associated with the UL control channel, and transmit or drop the UL control channel in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
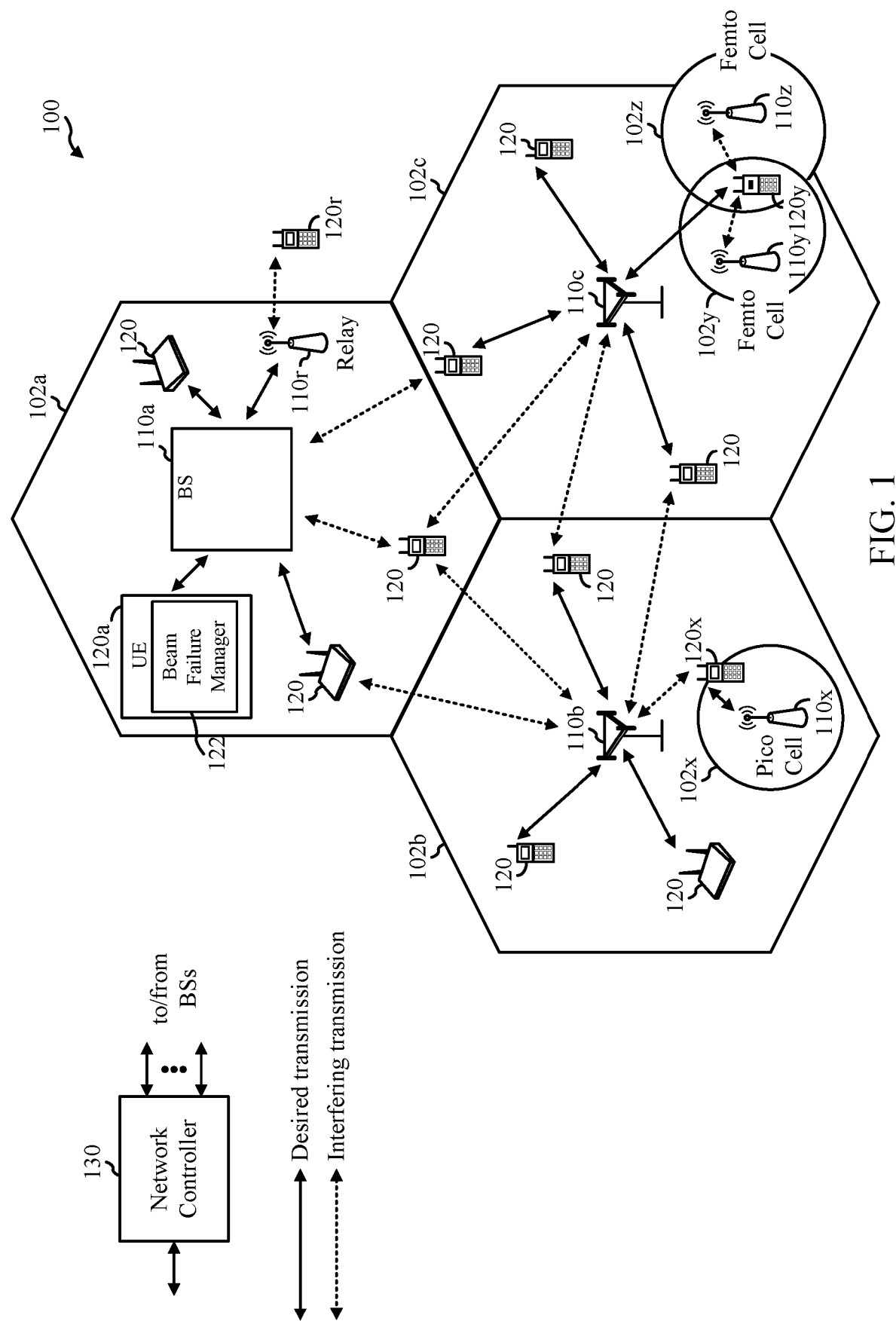
FIG. 1 is a block diagram conceptually illustrating an example telecommunications system, in accordance with certain aspects of the present disclosure.

Aspects of the present disclosure provide apparatus, methods, processing systems, and computer readable mediums for prioritization of control channel transmissions for beam failure recovery (BFR). The control channel for beam failure recovery may be referred to as a physical uplink control channel (PUCCH)-BFR. In some scenarios, the transmission of the PUCCH-BFR may collide with a transmission of another UL signal. Both the PUCCH-BFR and the other UL signal may be scheduled for transmission using the same resources. In this case, the priorities associated with the PUCCH-BFR and the other UL signal may be compared to determine which one of the PUCCH-BFR and the other UL signal is to be prioritized and transmitted using the resources, or in some cases, multiplexed together for transmission using the resources. The priority may be implemented using a two-level priority system (e.g., high priority or low priority), and may be configured by specification, dynamically configured by a base station, or implied at the UE based on a type of traffic associated with a cell experiencing beam failure, as described in more detail herein.

The following description provides examples of beam failure detection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network). As shown in FIG. 1, the UE 120a includes a beam failure manager 122 that determines prioritization associated with a control channel used for beam failure recovery (BFR), in accordance with aspects of the present disclosure. For example, the beam failure manager 122 may select a priority associated with an uplink (UL) control channel for indicating a beam failure recovery request (BFRQ) (e.g., also referred to as a link recovery request (LLR)). The beam failure manager 122 may also detect that the UL control channel is scheduled for transmission using resources overlapped with resources scheduled for transmission of another UL signal, determine, in response to the detection, whether to transmit the UL control channel based on the priority associated with the UL control channel, and transmit or drop the transmission of the UL control channel in accordance with the determination. In some cases, the UE may determine to multiplex the UL control channel and the other UL signal if, for example, the priorities associated with the UL control channel and the other UL signal are the same.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102*y* and 102*z*, respectively. A BS may support one or multiple cells. The BSs 110 communicate with user equipment (UEs) 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
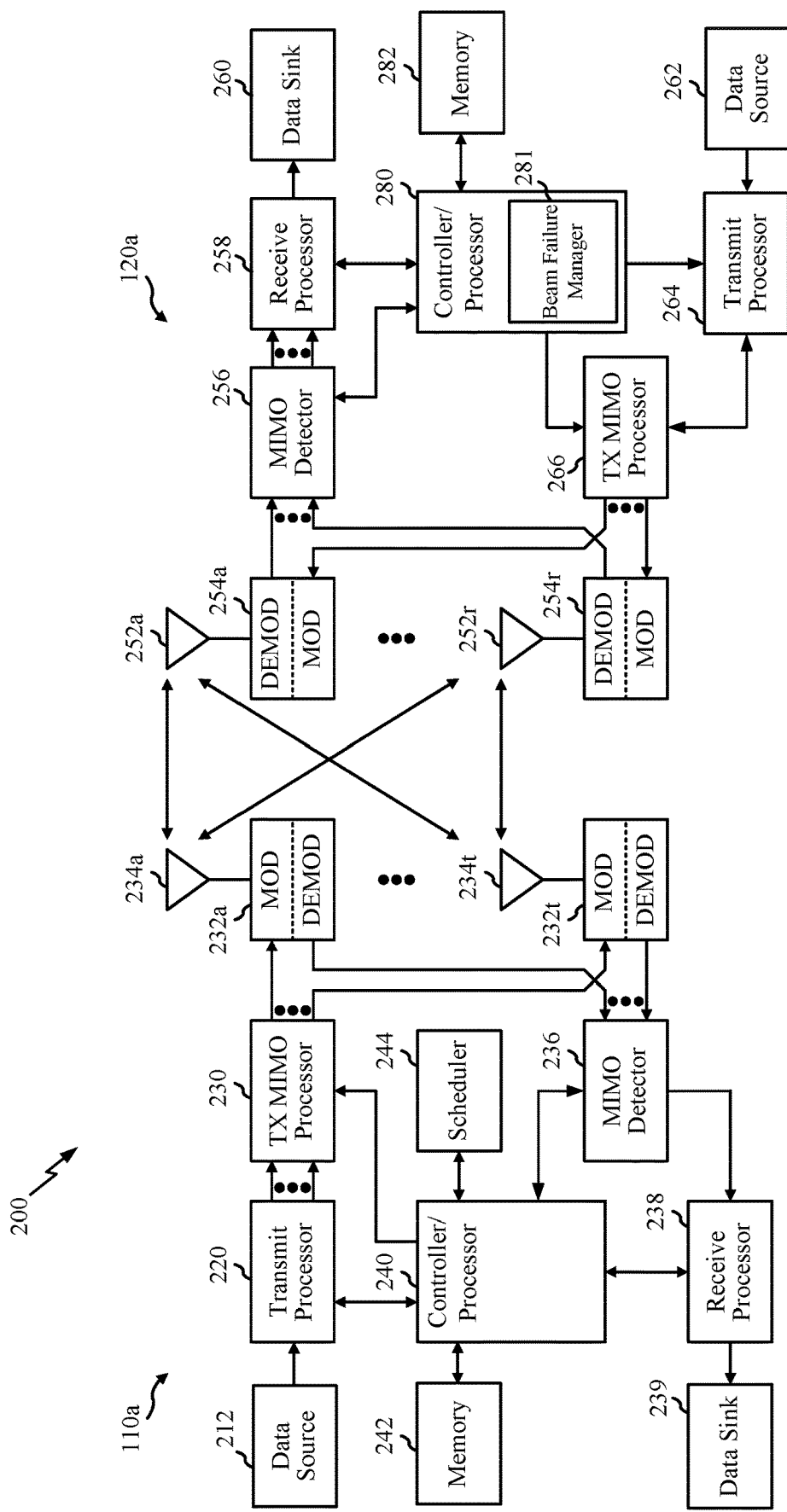
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 280 of the UE 120*a* has includes a beam failure manager 281 that determines prioritization associated with a control channel used for BFR, according to aspects described herein. Although shown at the Controller/Processor, other components of the UE 120*a* and BS 110*a* may be used to perform the operations described herein.

Example Techniques for Beam Failure Detection

In certain wireless communication systems (e.g., 5G NR), a UE may communicate with a base station via multiple cells (e.g., a primary cell (PCell) and at least one secondary cell (SCell)) served by multiple component carriers, which may be referred to as carrier aggregation. In some cases, carrier aggregation may be used to increase the bandwidth of communications between the UE and base station. In the case of beamformed communication systems (e.g., 5G NR), carrier aggregation may also enable the use of different beams for various traffic flows, such as wide beams for broadcast control signaling or narrow beams for UE-specific data traffic.

Narrow-beam transmission and reception is useful for improving the link budget at millimeter-wave frequencies but may be susceptible to beam failure. A beam failure generally refers to a scenario in which the quality of a beam for control resource sets (CORESETs) falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Beam failure may be detected by monitoring a beam failure detection (BFD) reference signal (RS) and assessing if a beam failure trigger condition has been met. For example, beam failure detection may triggered if an estimated block error rate (BLER) of reference signals associated with all configured CORESET is above a threshold (e.g., 10%). In other cases, if a measured signal quality (e.g., reference signal receive power (RSRP)) of the BFD RSs meet certain criterion (e.g., below a certain threshold for a certain time period), a beam failure recovery procedure may be initiated. To find candidate new beams, the UE may monitor a beam identification reference signal. When a UE has declared beam failure and found a new beam, the UE may transmit a beam failure recovery request (BFRQ) message to the serving BS. The BS responds to the request by transmitting a beam failure recovery (BFR) response over a CORESET (e.g., also referred to as a CORESET-BFR) to the UE and the UE monitors the CORESET for the response. If the response is received successfully, the beam recovery is completed and a new beam pair link may be established. If the UE cannot detect any response within a specific time period, the UE may perform a retransmission of the request. If the UE cannot detect any response after a specified number of retransmissions, then the UE may notify higher layers, potentially leading to RLF and cell reselection.

Figure 3:
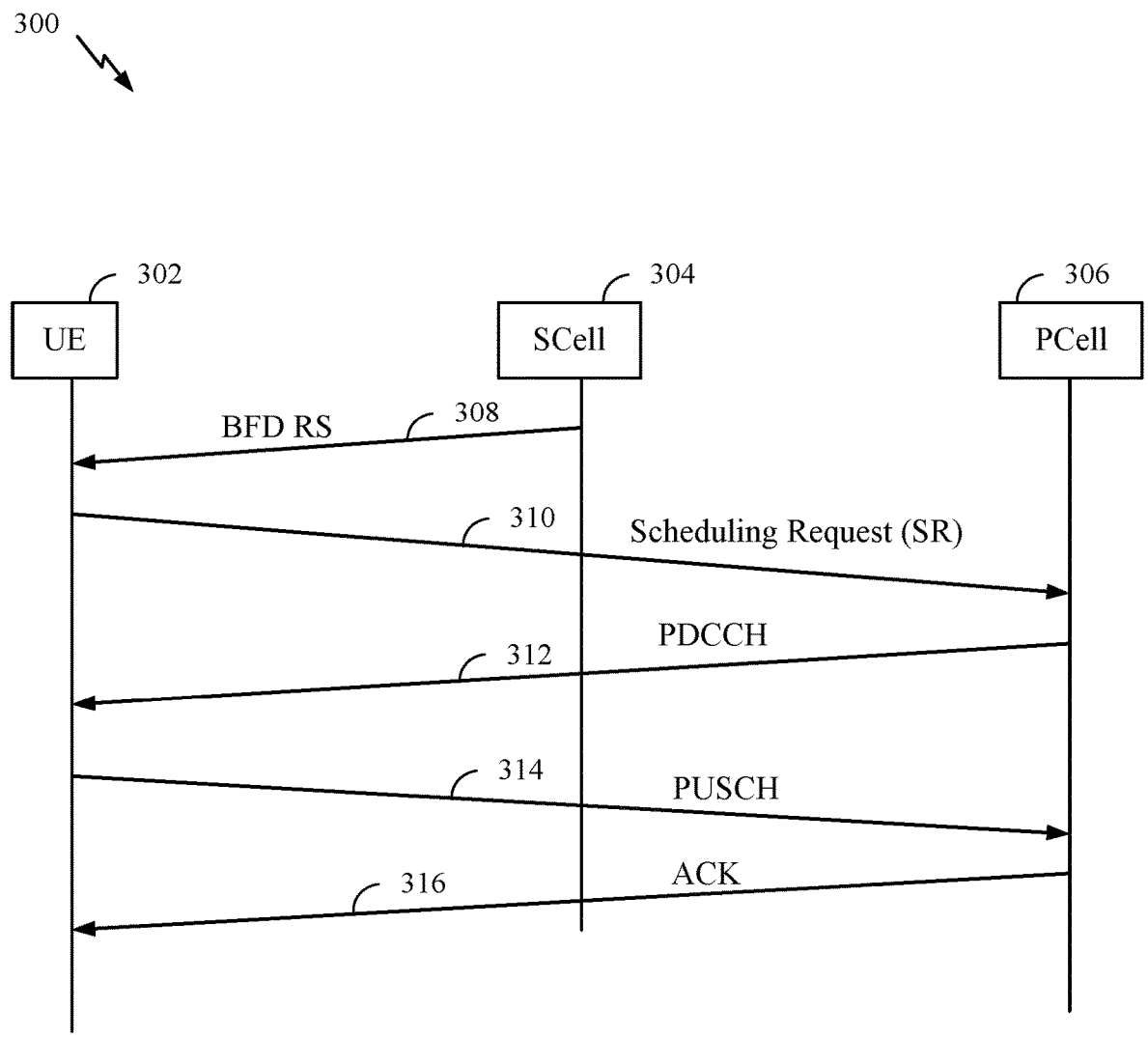
FIG. 3 is an example beam failure detection and recovery procedure, in accordance with certain aspects of the present disclosure.

FIG. 3 is a call flow illustrating example operations 300 for beam failure detection and recovery, in accordance with certain aspects of the present disclosure. Beam failure may be detected by monitoring a beam failure detection (BFD) reference signal (RS) 308 and assessing if a beam failure trigger condition has been met. For example, as shown in FIG. 3, the UE 302 may monitor the BFD RS 308 from the SCell 304. In some examples, beam failure detection is triggered if an estimated block error rate (BLER) of reference signals associated with a configured control resource set (CORESET) is above a threshold (e.g., 10%).

To recover the SCell 304, the UE 302 can send a beam failure request (BFRQ) message on another cell. In some examples, the BFRQ is sent on the PCell 306, as shown in FIG. 3. In NR systems, a two-step BFRQ may be used. The BFRQ may request a new transmission. As shown in FIG. 3, after detecting beam failure, the UE 302 sends the first step (or first stage) of the BFRQ. The first step of the BFRQ message may include a scheduling request (SR) 310 on the PCell 306. The SR 310 may be sent on dedicated SR resources. The SR may request scheduling for the second step (or second stage) of the BFRQ message. In some cases, the resources used to transmit a control channel having the SR may collide (e.g., be the same as) other UL signal by the UE 302. In this case, the UE may determine which one of the control channel or the other UL signal to prioritize based on configured priorities associated with the control channel and the other UL signal, as described in more detail herein.

As shown in FIG. 3, the UE 302 may receive a PDCCH 312 from the PCell 306, in response to the SR 310, scheduling the second set of the BFRQ message. The UE 302 then sends the scheduled second step of the BFRQ message 314 on the PCell 306. For example, the UE 302 sends a PUSCH including a MAC-CE, as shown in FIG. 3. The MAC-CE may include an index of the failed CC and a new recovery beam candidate beam. In some examples, to find candidate new beams, the UE may monitor a beam identification reference signal.

The PCell 306 may respond to the BFRQ by transmitting a beam failure recovery response (BFRR) message 316 to the UE 302, as shown in FIG. 3. The BFRR message may acknowledge the MAC-CE and include an uplink grant scheduling a new transmission. For example, the uplink grant may schedule a transmission for the same HARQ process as the PUSCH carrying the MAC-CE in the step two of the BFRQ. In some examples, the BFRR is sent over a CORESET (e.g., referred to as a CORESET-BFR) the UE 302 monitors for the response.

If the response is received successfully, the beam recovery is completed and a new BPL may be established. If the UE 302 cannot detect any response within a specific time period, the UE 302 may perform a retransmission of the request. If the UE 302 cannot detect any response after a specified number of retransmissions, then the UE 302 may notify higher layers, potentially leading to RLF and cell reselection.

Example Techniques for Prioritization of a Control Channel for Beam Failure Recovery Aspects of the present disclosure provide apparatus, methods, processing systems, and computer readable mediums for prioritization of control channel transmissions for beam failure recovery (BFR). The control channel for beam failure recovery may be referred to as a physical uplink control channel (PUCCH)-BFR. In some scenarios, the transmission of the PUCCH-BFR may collide with a transmission of another UL signal. The other UL signal may include a control channel or data channel. Both the PUCCH-BFR and the other UL signal may be scheduled for transmission using the same resources. In this case, the priorities associated with the PUCCH-BFR and the other UL signal may be compared to determine which one of the PUCCH-BFR and the other UL signal is to be prioritized and transmitted using the resources, or in some case, multiplexed together for transmission using the resources, as described in more detail herein. The priority may be implemented using a two-level priority system (e.g., high priority or low priority), and may be configured by specification, dynamically configured by a base station, or implied at the UE based on a type of traffic associated with a cell experiencing beam failure, as described in more detail herein.

Certain aspects of the present disclosure are generally directed to techniques for determining a priority associated with the PUCCH-BFR. The PUCCH-BFR may be used for transmission of a BFRQ (e.g., also referred to as a PUCCH-BFR). Two levels of SR priorities may be defined (e.g., high priority and low priority). The SR priorities may be known at the PHY layer of the UE. Certain aspects of the present disclosure are directed to techniques for determining and using priority information to handle prioritization/multiplexing of UL transmissions (e.g., PUCCH-BFR and other UL signal). The PHY-layer SR priorities may be determined by an explicit indication (e.g., as a new radio resource control (RRC) parameter) for each SR resource configuration.

In some cases, priority rules between high and low priority signals, and within low priority signals, may be defined. For example, for intra-UE collision handling at the PHY layer, in case a high-priority UL transmission overlaps with a low-priority UL transmission, the low-priority UL transmission may be dropped under certain constraints (e.g., particularly timeline). The UL transmission may be a positive SR, hybrid acknowledgement (ACK) repeat request (HARQ)-ACK, physical uplink shared channel (PUSCH), or persistent (P)/semi-persistent (SP)-channel state information (CSI) on PUCCH.

Certain aspects of the present disclosure provide various priority rules for PUCCH-BFR in presence of two priorities. Priority rule of PUCCH-BFR carrying SR versus other PUCCH signaling not carrying SR may be defined for enhanced mobile broadband (eMBB). Certain aspects are directed to techniques for managing a transmission of PUCCH-BFR when colliding with another UL transmission, both having high priority, and determining the priority for PUCCH-BFR in the context of the high and low priorities for the other UL transmission colliding with the PUCCH-BFR. For eMBB, when PUCCH-BFR collides with other PUCCH that does not carry SR, dropping/multiplexing rules which may be defined in a standard for collision handling between SR and other PUCCH may be used, except when PUCCH-BFR is based on PUCCH format 0 and is colliding with HARQ-ACK based on PUCCH format 1.

Figure 4:
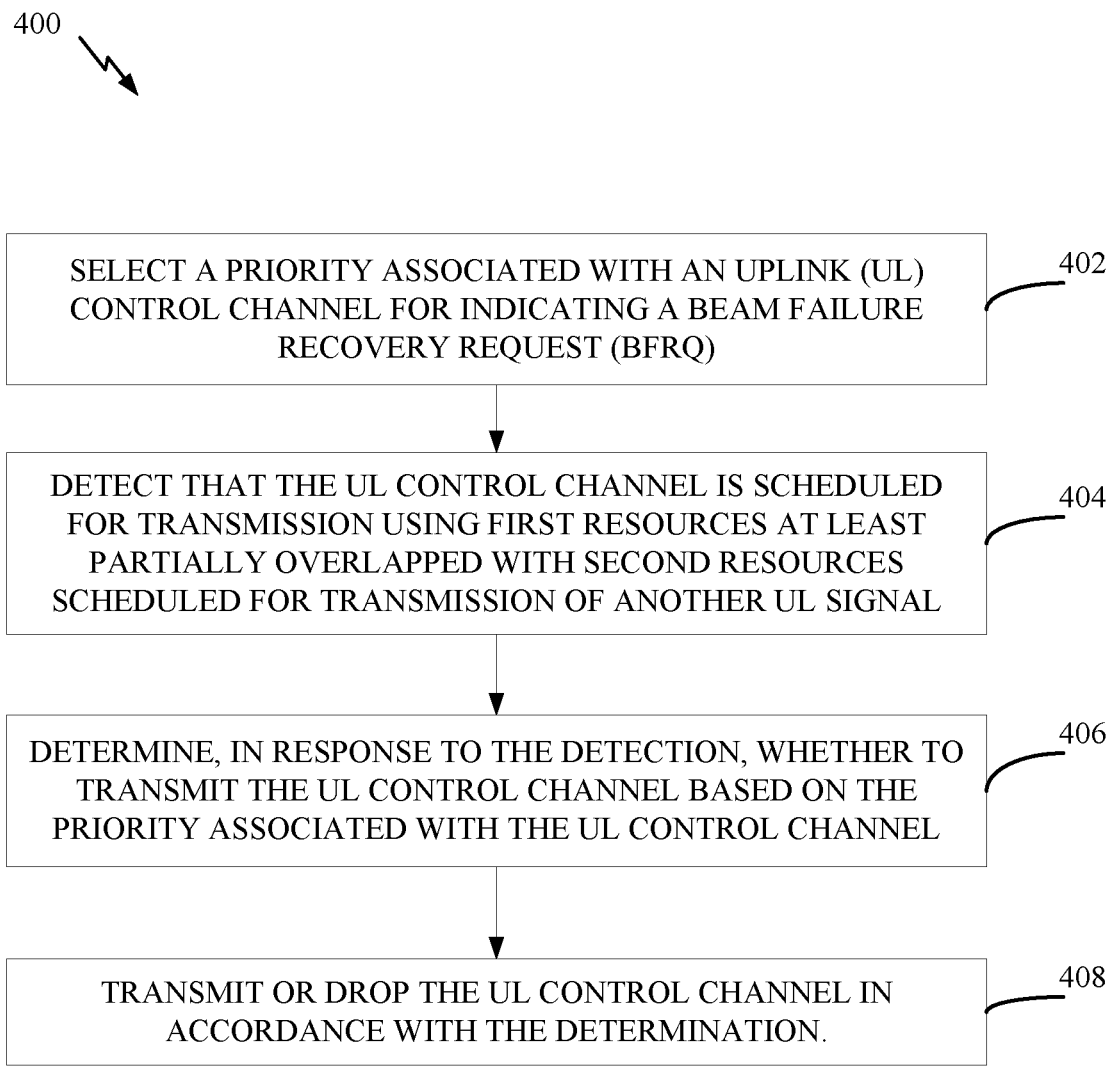
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., the UE 120a in the wireless communication network 100).

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 402, with the UE selecting a priority associated with an UL control channel (e.g., also referred to as a PUCCH-BFR) for indicating a BFRQ, and at block 404, detecting that the UL control channel is scheduled for transmission using first resources at least partially overlapped with second resources scheduled for transmission of another UL signal. A BFRQ may be also be referred to as a link recovery request (LLR). The UL control channel may be a scheduling request (SR), as described with respect to FIG. 3. The UL control channel may be transmitted on a primary cell (PCell) in some aspects. At block 406, the UE determines, in response to the detection, whether to transmit the UL control channel based on the priority associated with the UL control channel, and at block 408, transmits or drops the transmission of the UL control channel in accordance with the determination. For example, dropping the transmission of the UL control channel may include deferring the transmission of the UL control channel.

Certain aspects provide techniques for determining the priority for PUCCH-BFR. For example, the priority for the PUCCH may be the same priority (e.g., high priority or low priority) as the UL transmission (e.g., the other UL signal colliding with the PUCCH-BFR). The priority of the PUCCH-BFR may be configured by radio resource control (RRC), or dynamically indicated by a base station using medium access control (MAC)-control element (CE) or downlink control information (DCI).

In certain aspects, the UE may determine a special priority for the PUCCH-BFR. For example, the special priority may be higher than high and low priorities for the other UL transmission. The special priority may be described in a specification. For example, the special priority may be configured at the UE.

In certain aspects, the priority of the PUCCH-BFR may be determined dynamically in an implicit manner by the UE. For example, the priority of the PUCCH-BFR may be determined in accordance with a priority associated with a SCell experiencing beam failure. As described with respect to FIG. 3, a UE may detect a beam failure for an SCell. With respect to FIG. 4, the operations 400 may also include determining that a beam failure has occurred for one or more cells (e.g., SCells such as SCell 304), and generating the UL control channel having the BFRQ in response to the beam failure. In this case, the priority associated with the UL control channel may be selected based on a priority associated with the one or more cells. For instance, the priority of the PUCCH-BFR may be high if any failed SCell has a new Cell-level priority as high, and otherwise, the priority of the PUCCH-BFR may be low. The new Cell level priority may have two levels. For example, high priority may indicate that the Cell has URLLC traffic (e.g. or any high priority traffic), and low priority may indicate that the cell has no URLLC traffic.

In certain aspects, the cell-level priority may be explicitly indicated. For example, the cell-level priority may be explicitly configured by a base station via RRC or dynamically indicated by MAC-CE or DCI.

In certain aspects, the cell-level priority may be implicitly indicated. For example, the cell-level priority may be high if other signaling (e.g., configuration signaling, such as RRC signaling) indicates the cell carries URLLC traffic. For instance, the cell may be configured with Capability 2 (e.g., a single slot) shorter processing time line, based on which the UE may determine that the SCell carries URLLC signaling. The Capability 2 shorter processing time line may indicate a minimum offset between a DCI and a corresponding scheduled physical downlink shared channel (PDSCH), or between the PDSCH and corresponding HARQ signaling, allowing for the low latency of URLLC traffic. The shorter processing time line for Capability 2 may be a single slot. As another example, the cell may be configured with special DCI format supporting URLLC scheduling, based on which the UE may determine that the cell carries URLLC traffic. As yet another example, the UE may determine that the UL transmission is configured with high priority by, for instance, determining that the corresponding SR resource is RRC configured with high priority.

Certain aspects of the present disclosure are generally directed to handling the collision of PUCCH-BFR and other UL transmission. As used herein, a collision of PUCCH-BFR and other UL transmission generally refers to the PUCCH-BFR and the other UL transmission being scheduled for transmission using the same resources. For example, the PUCCH-BFR and the other UL transmission may be scheduled for transmission using the same time and frequency resources, resulting in collision of the PUCCH-BFR and other UL transmission.

In certain aspects, the PUCCH-BFR and other UL transmission having the same priority (e.g., high or low priority) may collide. In this case, the PUCCH-BFR may be multiplexed with the other UL transmission, or the other UL transmission may be dropped (e.g., not transmitted using the resources). For example, rules configured at the UE may be followed to determine how to handle the collision.

In some cases, if the PUCCH-BFR and other UL transmission have the same priority, the PUCCH-BFR may be multiplexed with the other UL transmission or the other UL transmission may be dropped (e.g., in accordance a rule configured at the UE), except for a case where the PUCCH-BFR is PUCCH format 0 and the other UL transmission includes HARQ information (e.g., is a HARQ-ACK) that is in PUCCH format 1. In certain aspects, if the PUCCH-BFR is PUCCH format 0 and the other UL transmission is a HARQ-ACK that is in PUCCH format 1, the PUCCH-BFR may be dropped (e.g., not transmitted using the collision resources and deferred for transmission using other resources), and the UE may prioritize the HARQ-ACK. In other cases, if the PUCCH-BFR is PUCCH format 0 and the other UL transmission is a HARQ-ACK that is in PUCCH format 1, the UE may prioritize the PUCCH-BFR and drop the HARQ-ACK. In some cases, if the PUCCH-BFR is PUCCH format 0 and the other UL transmission is a HARQ-ACK that is in PUCCH format 1, the UE may determine whether to prioritize the PUCCH-BFR or the HARQ-ACK based on an indication from a base station.

In certain aspects, if the PUCCH-BFR and other UL transmission have the same priority, one of the PUCCH-BFR and the HARQ-ACK is prioritized. For example, the PUCCH-BFR may be prioritized either by a fixed rule in specification or as indicated by a BS. In other words, the PUCCH-BFR may be prioritized based on a rule that is RRC configured by the BS.

In certain aspects, the PUCCH-BFR and the other UL transmission having different priorities may collide. In this case, the UE may prioritize one of the PUCCH-BFR and the other UL transmission having a higher priority. For example, if the PUCCH-BFR has high priority, and the other UL transmission has low priority, the other UL transmission may be dropped and the PUCCH-BFR may be transmitted. In certain aspects, one of the PUCCH-BFR and the other UL transmission may be prioritized, for example, based on a fixed rule in specification (e.g., configured at the UE) or as indicated by the base station (e.g., via RRC). For instance, as described herein, the PUCCH-BFR may be configured with a special priority that is higher than the high or low priorities that may be associated with the other UL transmission. In this case, the PUCCH-BFR may be prioritized.

Figure 5:
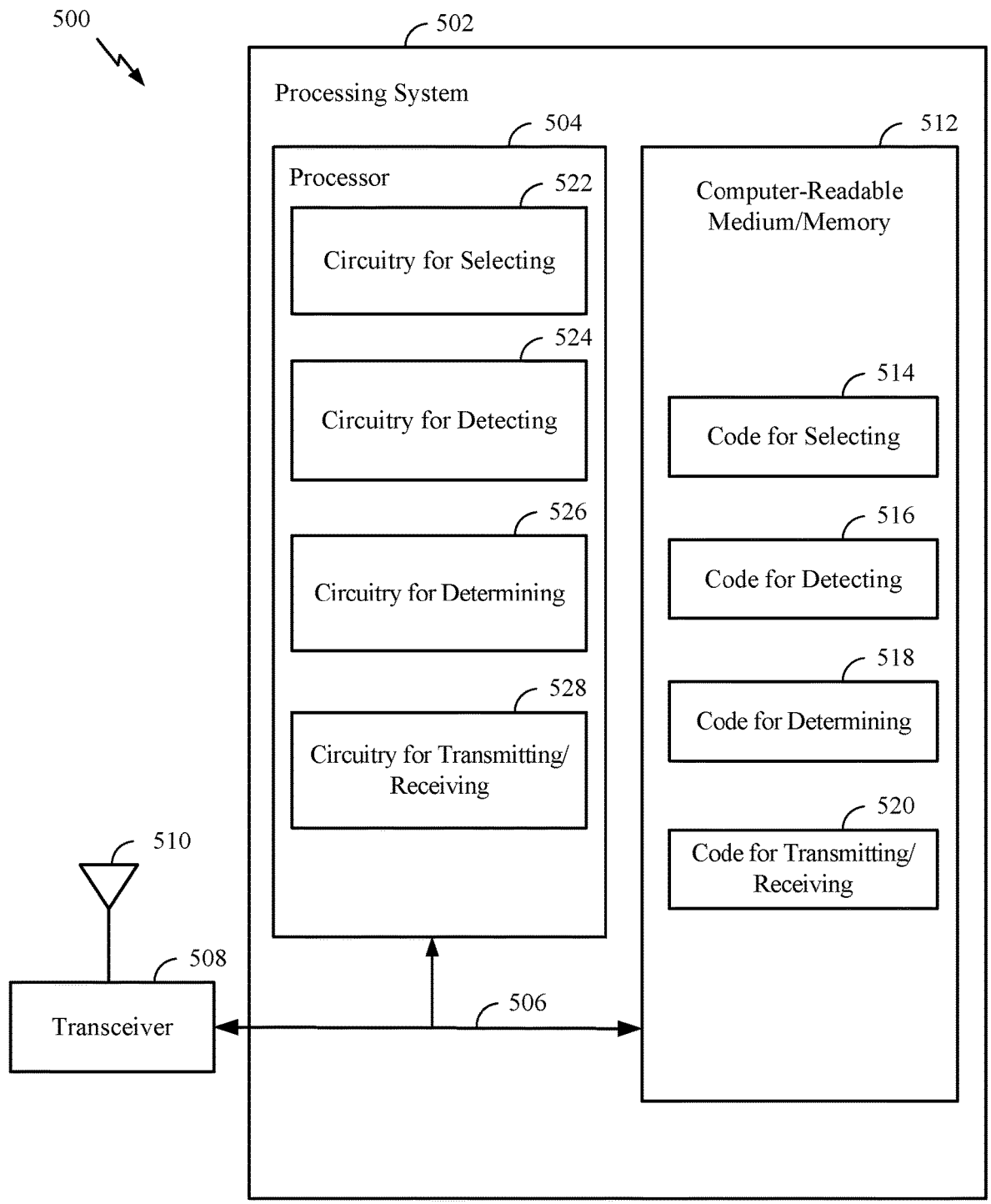
FIG. 5 illustrates a communications device that may include various components configured to perform operations for the techniques disclosed herein in accordance with aspects of the present disclosure.

FIG. 5 illustrates a communications device 500 (e.g., the UE 120a) that may include various components (e.g., corresponding to means-plus-function components) configured to perform operations for the techniques disclosed herein, such as the operations illustrated in FIG. 5. The communications device 500 includes a processing system 502 coupled to a transceiver 508 (e.g., a transmitter and/or receiver). The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIG. 4, or other operations for performing the various techniques discussed herein for beam failure recovery. In certain aspects, computer-readable medium/memory 512 stores code for selecting 514, code for detecting 516, code for determining 518, and/or code for transmitting/receiving 520. In certain aspects, the processor 504 has circuitry configured to implement the code stored in the computer-readable medium/memory 512. The processor 504 includes circuitry for selecting 522, circuitry for detecting 524, circuitry for determining 526, and/or circuitry for transmitting/receiving 528.

Example Aspects

In a first aspect, a method for wireless communication, includes selecting a priority associated with an uplink (UL) control channel for indicating a beam failure recovery request (BFRQ), detecting that the UL control channel is scheduled for transmission using first resources at least partially overlapped with second resources scheduled for transmission of another UL signal, determining, in response to the detection, whether to transmit the UL control channel based on the priority associated with the UL control channel, and transmitting or dropping the transmission of the UL control channel in accordance with the determination.

In a second aspect, in combination with the first aspect, dropping the transmission of the UL control channel comprises deferring the transmission of the UL control channel.

In a third aspect, in combination with one or more of the first aspect and the second aspect, the method may also include receiving signaling indicating that the UL control channel has one priority of multiple priorities applicable to the other UL signal, wherein the selection of the priority is based on the received signaling.

In a fourth aspect, in combination with the third aspects and one or more of the first and second aspects, the multiple priorities applicable to the other UL signal include a low priority and a high priority.

In a fifth aspect, in combination with the third aspect and one or more of the first and third aspects, the received signaling comprises radio-resource control (RRC) signaling, medium access control (MAC)-control element (CE) signaling, downlink control information, or any combination thereof.

In a sixth aspect, in combination with one or more of the first through fifth aspects, the priority of the UL control channel is higher that a priority of the other UL signal.

In a seventh aspect, in combination with one or more of the first through sixth aspects, the method further includes determining that a beam failure has occurred for one or more cells, and generating the UL control channel having the BFRQ in response to the beam failure, wherein the priority associated with the UL control channel is selected based on a priority associated with the one or more cells.

In an eighth aspect, in combination with the seventh aspect and one or more of the first through sixth aspects, the one or more cells include one or more cells for which the beam failure has been detected, the beam failure triggering the BFRQ.

In a ninth aspect, in combination with the seventh aspect and one or more of the first through sixth aspects, the method further includes receiving signaling indicating the priority associated with the one or more cells.

In a tenth aspect, in combination the ninth aspect and one or more of the first through eighth aspects, wherein the received signaling comprises RRC signaling, MAC-CE signaling, DCI, or any combination thereof.

In an eleventh aspect, in combination with one or more of the first through tenth aspects, the method further includes determining the priority associated with the one or more cells based on a type of traffic carried by the one or more cells.

In a twelfth aspect, in combination with the eleventh aspects and one or more of the first through tenth aspects, the type of traffic comprises ultra-reliable low-latency communication (URLLC) traffic.

In a thirteenth aspect in combination with the eleventh aspects and one or more of the first through tenth aspects, the type of traffic is determined based on a processing time line associated with the traffic, whether a format of DCI configuring the one or more cells supports the type of traffic, a priority associated UL resources of the one or more cells, or any combination thereof.

In a fourteenth aspect, in combination with one or more of the first through thirteenth aspects, the method further includes if the priority associated with the UL control channel is the same as a priority associated with the other UL signal and if the UL control channel does not comprise a format 0 control channel or the other UL signal does not comprise a format 1 control channel having hybrid automatic repeat request (HARQ) information, the transmission of the UL control channel comprises: multiplexing the UL control channel with the other UL signal, or transmitting the UL control channel and dropping the transmission of the other UL signal, and if the priority associated with the UL control channel is the same as a priority associated with the other UL signal and if the UL control channel comprises the format 0 control channel and the other UL signal comprises the format 1 control channel having the HARQ information, the method comprises transmitting the other UL signal and dropping the UL control channel.

In a fifteenth aspect, in combination with one or more of the first through fourteenth aspects, if the priority associated with the UL control channel is the same as a priority associated with the other UL signal, the determination is based on whether the UL control channel comprises a format 0 control channel and the other UL signal comprises a format 1 control channel having HARQ information.

In a sixteenth aspect, in combination one or more of the first through fifteenth aspects, transmitting the UL control channel comprises: multiplexing the UL control channel with the other UL signal, or transmitting the UL control channel and dropping the transmission of the other UL signal.

In a seventeenth aspect, in combination with one or more of the first through sixteenth aspects, if the UL control channel comprises a format 0 control channel and the other UL signal comprises a format 1 control channel having HARQ information, the determination comprises determining to transmit the other UL signal and dropping the transmission of the UL control channel having the BFRQ.

In an eighteenth aspect, in combination with one or more of the first through seventeenth aspects, if the UL control channel comprises a format 0 control channel and the other UL signal comprises a format 1 control channel having HARQ information, the determination of whether to transmit the UL control channel comprises determining to transmit the UL control channel having the BFRQ and dropping the other UL signal.

In a nineteenth aspect, in combination with one or more of the first through eighteenth aspects, if the UL control channel comprises a format 0 control channel and the other UL signal comprises a format 1 control channel having HARQ information, the method further comprises receiving an indication of whether to transmit the UL control channel or drop the transmission of the UL control channel, the determination being based on the received indication.

In a twentieth aspect, in combination with one or more of the first through nineteenth aspects, if the priority associated with the UL control channel is the same as a priority associated with the other UL signal, the determination comprises determining to transmit the UL control channel having the BFRQ and drop transmission of the other UL signal.

In a twenty first aspect, in combination with one or more of the seventeenth through twentieth aspects, if the priority associated with the UL control channel is the same as a priority associated with the other UL signal, the determination comprises determining to transmit the other UL signal and drop the transmission of the UL control channel having the BFRQ.

In a twenty second aspect, in combination with the twenty first aspect and one or more of the first through twentieth aspects, the method further includes receiving an indication of whether to transmit the UL control channel or drop the transmission of the UL control channel, the determination being based on the indication.

In a twenty third aspect, in combination with one or more of the first through twenty second aspects, if the priority associated with the UL control channel is different than a priority associated with the other UL signal, the determination comprises determining to transmit the UL control channel if the priority associated with the UL control channel is higher than the priority associated with the other UL signal.

In a twenty fourth aspect, in combination with one or more of the first through twenty third aspects, if the priority associated with the control channel is different than a priority associated with the other UL signal, the determination comprises determining to transmit the UL control channel having the BFRQ and drop the transmission of the other UL signal.

In a twenty fifth aspect, in combination with one or more of the first through twenty fourth aspects, if the priority associated with the UL control channel is different than a priority associated with the other UL signal, the determination comprises determining to transmit the other UL signal and drop the transmission of the UL control channel having the BFRQ.

In a twenty sixth aspect, in combination with the twenty fifth aspect and one or more of the first through twenty fourth aspects, the method further includes receiving an indication of whether to transmit the UL control channel or drop the transmission of the UL control channel, the determination being based on the received indication.

In a twenty seventh aspect, an apparatus for wireless communication includes a memory and a processor coupled to the memory, the processor and the memory being configured to: select a priority associated with an uplink (UL) control channel for indicating a beam failure recovery request (BFRQ), detect that the UL control channel is scheduled for transmission using first resources at least partially overlapped with second resources scheduled for transmission of another UL signal, determine, in response to the detection, whether to transmit the UL control channel based on the priority associated with the UL control channel, and transmit or drop the transmission of the UL control channel in accordance with the determination.

In a twenty eighth aspect, an apparatus for wireless communication, includes means for selecting a priority associated with an uplink (UL) control channel for indicating a beam failure recovery request (BFRQ), means for detecting that the UL control channel is scheduled for transmission using first resources at least partially overlapped with second resources scheduled for transmission of another UL signal, means for determining, in response to the detection, whether to transmit the UL control channel based on the priority associated with the UL control channel, and means for transmitting or dropping the transmission of the UL control channel in accordance with the determination.

In a twenty ninth aspect, a computer-readable medium has instructions stored thereon to cause a user equipment (UE) to: select a priority associated with an uplink (UL) control channel for indicating a beam failure recovery request (BFRQ), detect that the UL control channel is scheduled for transmission using first resources at least partially overlapped with second resources scheduled for transmission of another UL signal, determine, in response to the detection, whether to transmit the UL control channel based on the priority associated with the UL control channel, and transmit or drop the transmission of the UL control channel in accordance with the determination.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
   selecting a priority associated with an uplink (UL) control channel for indicating a beam failure recovery request (BFRQ);
   detecting that the UL control channel is scheduled for transmission using first resources at least partially overlapped with second resources scheduled for transmission of another UL signal;
   determining, in response to the detection, whether to transmit the UL control channel based on the priority associated with the UL control channel, wherein:
   if the priority associated with the UL control channel is the same as a priority associated with the other UL signal and if the UL control channel does not comprise a format 0 control channel or the other UL signal does not comprise a format 1 control channel having hybrid automatic repeat request (HARQ) information, the determination includes determining to:
   multiplex the UL control channel with the other UL signal; or
   transmit the UL control channel and drop the transmission of the other UL signal; and
   if the priority associated with the UL control channel is the same as the priority associated with the other UL signal and if the UL control channel comprises the format 0 control channel and the other UL signal comprises the format 1 control channel having the HARQ information, the determination includes determining to transmit the other UL signal and dropping the transmission of the UL control channel; and
   transmitting or dropping the transmission of the UL control channel in accordance with the determination.

2. The method of claim 1, wherein dropping the transmission of the UL control channel comprises deferring the transmission of the UL control channel.

3. The method of claim 1, further comprising receiving signaling indicating that the UL control channel has one priority of multiple priorities applicable to the other UL signal, wherein the selection of the priority is based on the received signaling.

4. The method of claim 3, wherein the multiple priorities applicable to the other UL signal include a low priority and a high priority.

5. The method of claim 3, wherein the received signaling comprises radio-resource control (RRC) signaling, medium access control (MAC)-control element (CE) signaling, downlink control information, or any combination thereof.

6. The method of claim 1, further comprising determining that a beam failure has occurred for one or more cells, wherein the priority associated with the UL control channel is selected based on a priority associated with the one or more cells.

7. The method of claim 6, wherein the one or more cells include one or more cells for which the beam failure has been detected, the beam failure triggering the BFRQ.

8. The method of claim 6, further comprising receiving signaling indicating the priority associated with the one or more cells.

9. The method of claim 8, wherein the received signaling comprises RRC signaling, MAC-CE signaling, DCI, or any combination thereof.

10. The method of claim 6, further comprising determining the priority associated with the one or more cells based on a type of traffic carried by the one or more cells.

11. The method of claim 10, wherein the type of traffic comprises ultra-reliable low-latency communication (URLLC) traffic.

12. The method of claim 10, wherein the type of traffic is determined based on a processing time line associated with the traffic, whether a format of DCI configuring the one or more cells supports the type of traffic, a priority associated UL resources of the one or more cells, or any combination thereof.

13. The method of claim 1, wherein, if the priority associated with the UL control channel is the same as the priority associated with the other UL signal and if the UL control channel does not comprise the format 0 control channel or the other UL signal does not comprise the format 1 control channel having the HARQ information, the transmission of the UL control channel comprises multiplexing the UL control channel with the other UL signal.

14. The method of claim 1, wherein, if the priority associated with the UL control channel is the same as the priority associated with the other UL signal, the determination is based on whether the UL control channel comprises the format 0 control channel and the other UL signal comprises the format 1 control channel having the HARQ information.

15. The method of claim 1, wherein, if the UL control channel comprises the format 0 control channel and the other UL signal comprises the format 1 control channel having the HARQ information, the method further comprises receiving an indication of whether to transmit the UL control channel or drop the transmission of the UL control channel, the determination being based on the received indication.

16. The method of claim 1, further comprises receiving an indication of whether to transmit the UL control channel or drop the transmission of the UL control channel, the determination being based on the indication.

17. The method of claim 1, wherein, if the priority associated with the UL control channel is different than the priority associated with the other UL signal, the determination comprises determining to transmit the UL control channel if the priority associated with the UL control channel is higher than the priority associated with the other UL signal.

18. The method of claim 1, wherein, if the priority associated with the control channel is different than the priority associated with the other UL signal, the determination comprises determining to transmit the UL control channel having the BFRQ and drop the transmission of the other UL signal.

19. The method of claim 1, wherein, if the priority associated with the UL control channel is different than the priority associated with the other UL signal, the determination comprises determining to transmit the other UL signal and drop the transmission of the UL control channel having the BFRQ.

20. The method of claim 19, further comprises receiving an indication of whether to transmit the UL control channel or drop the transmission of the UL control channel, the determination being based on the received indication.

21. An apparatus for wireless communication, comprising:
  a memory; and
  a processor coupled to the memory, the processor and the memory being configured to:
    select a priority associated with an uplink (UL) control channel for indicating a beam failure recovery request (BFRQ);
    detect that the UL control channel is scheduled for transmission using first resources at least partially overlapped with second resources scheduled for transmission of another UL signal;
    determine, in response to the detection, whether to transmit the UL control channel based on the priority associated with the UL control channel, wherein;
    if the priority associated with the UL control channel is the same as a priority associated with the other UL signal and if the UL control channel does not comprise a format 0 control channel or the other UL signal does not comprise a format 1 control channel having hybrid automatic repeat request (HARQ) information, the processor and the memory are configured to determine whether to transmit by determining to:
      multiplex the UL control channel with the other UL signal; or
      transmit the UL control channel and drop the transmission of the other UL signal; and
    if the priority associated with the UL control channel is the same as the priority associated with the other UL signal and if the UL control channel comprises the format 0 control channel and the other UL signal comprises the format 1 control channel having the HARQ information, the processor and the memory are configured to determine whether to transmit by determining to transmit the other UL signal and dropping the transmission of the UL control channel; and
    transmit or drop the transmission of the UL control channel in accordance with the determination.

22. The apparatus of claim 21, wherein the processor and the memory are further configured to receive signaling indicating that the UL control channel has one priority of multiple priorities applicable to the other UL signal, wherein the selection of the priority is based on the received signaling.

23. The apparatus of claim 21, wherein, if the priority associated with the UL control channel is the same as the priority associated with the other UL signal and if the UL control channel does not comprise a format 0 control channel or the other UL signal does not comprise a format 1 control channel having the HARQ information, the processor and the memory are configured to determine whether to transmit by determining to multiplex the UL control channel with the other UL signal.

24. A non-transitory computer-readable medium having instructions stored thereon to cause a user equipment (UE) to:
- select a priority associated with an uplink (UL) control channel for indicating a beam failure recovery request (BFRQ);
- detect that the UL control channel is scheduled for transmission using first resources at least partially overlapped with second resources scheduled for transmission of another UL signal;
- determine, in response to the detection, whether to transmit the UL control channel based on the priority associated with the UL control channel, wherein:
  - if the priority associated with the UL control channel is the same as a priority associated with the other UL signal and if the UL control channel does not comprise a format 0 control channel or the other UL signal does not comprise a format 1 control channel having hybrid automatic repeat request (HARQ) information, the determination includes determining to:
    - multiplex the UL control channel with the other UL signal; or
    - transmit the UL control channel and drop the transmission of the other UL signal; and
  - if the priority associated with the UL control channel is the same as the priority associated with the other UL signal and if the UL control channel comprises the format 0 control channel and the other UL signal comprises the format 1 control channel having the HARQ information, the determination includes determining to transmit the other UL signal and dropping the transmission of the UL control channel; and
- transmit or drop the transmission of the UL control channel in accordance with the determination.

25. The non-transitory computer-readable medium of claim 24, wherein the non-transitory computer-readable medium further includes instructions stored thereon to cause the UE to receive signaling indicating that the UL control channel has one priority of multiple priorities applicable to the other UL signal, wherein the selection of the priority is based on the received signaling.

26. The non-transitory computer-readable medium of claim 24, wherein, if the priority associated with the UL control channel is the same as the priority associated with the other UL signal and if the UL control channel does not comprise a format 0 control channel or the other UL signal does not comprise a format 1 control channel having the HARQ information, the non-transitory computer-readable medium includes instructions stored thereon to cause the UE to determine whether to transmit by determining to multiplex the UL control channel with the other UL signal.

27. An apparatus for wireless communication, comprising:
- means for selecting a priority associated with an uplink (UL) control channel for indicating a beam failure recovery request (BFRQ);
- means for detecting that the UL control channel is scheduled for transmission using first resources at least partially overlapped with second resources scheduled for transmission of another UL signal;
- means for determining, in response to the detection, whether to transmit the UL control channel based on the priority associated with the UL control channel, wherein:
  - if the priority associated with the UL control channel is the same as a priority associated with the other UL signal and if the UL control channel does not comprise a format 0 control channel or the other UL signal does not comprise a format 1 control channel having hybrid automatic repeat request (HARQ) information, the means for determining is configured to determine to:
    - multiplex the UL control channel with the other UL signal; or
    - transmit the UL control channel and drop the transmission of the other UL signal; and
  - if the priority associated with the UL control channel is the same as the priority associated with the other UL signal and if the UL control channel comprises the format 0 control channel and the other UL signal comprises the format 1 control channel having the HARQ information, the means for determining is configured to determine to transmit the other UL signal and drop the transmission of the UL control channel; and
- means for transmitting or means for dropping the transmission of the UL control channel in accordance with the determination.

28. The apparatus of claim 27, wherein, if the priority associated with the UL control channel is the same as the priority associated with the other UL signal and if the UL control channel does not comprise a format 0 control channel or the other UL signal does not comprise a format 1 control channel having the HARQ information, the means for determining is configured to determine to multiplex the UL control channel with the other UL signal.

* * * * *